June 26, 1962
W. S. TAYLOR
3,040,579
MEASURING APPARATUS
Filed Sept. 23, 1959
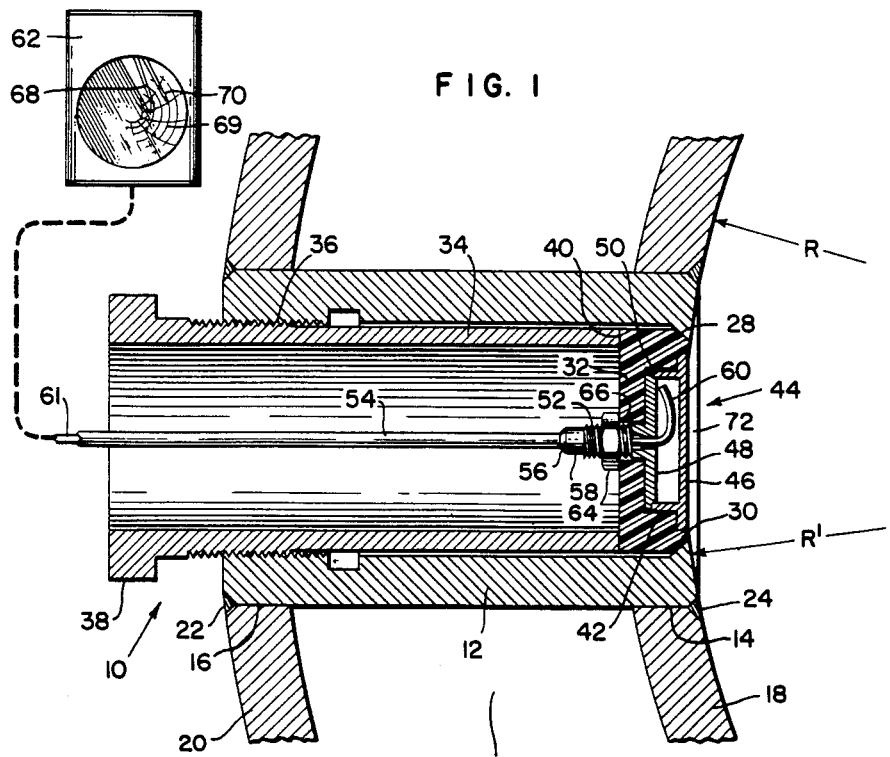
FIG. 1
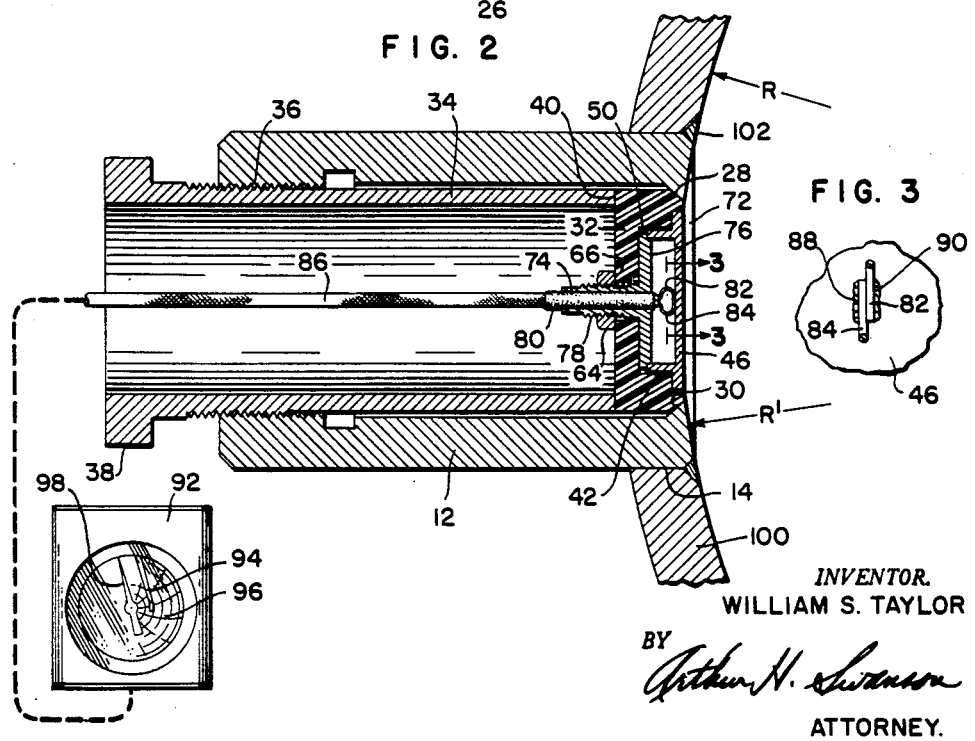
FIG. 2
FIG. 3
INVENTOR.
WILLIAM S. TAYLOR
BY *Arthur H. Swanson*
ATTORNEY.

United States Patent Office 3,040,579
Patented June 26, 1962

3,040,579
MEASURING APPARATUS
William S. Taylor, Drexel Hill, Pa., assignor to Minneapolis-Honeywell Regulator Company, Minneapolis, Minn., a corporation of Delaware
Filed Sept. 23, 1959, Ser. No. 841,858
13 Claims. (Cl. 73—343)

The object of the present invention is to provide an apparatus to more accurately sense, indicate and record the temperature of contents within a kettle that has heretofore been disclosed in the prior temperature measuring art.

It is particularly advantageous to employ this temperature measuring apparatus to accurately measure the temperature of substances within a kettle which is provided with a steam jacket. In these kettles steam is circulated through a steam jacket which surrounds and is spaced from the inner wall of the kettle. With this arrangement as steam or other heating medium is circulated through the kettle jacket the heat from this steam is transmitted through the inner wall of the kettle and is thus used to heat the contents which are within this kettle.

Prior temperature measuring devices which have employed a temperature sensing element in the inner wall of the kettle have made inaccurate readings of the contents within the kettle because of the following reasons: First, some of the heat being transmitted through the inner wall of a steam kettle is transferred to and sensed by the sensing element of these temperature measuring devices and/or secondly because additional heat will flow by means of convection from the steam jacket wall to the heat being sensed at a single point on the inner wall of the kettle by these prior temperature sensing elements. Such prior art sensing elements will thus not permit the heat within the inner wall of the kettle that is to be sensed by this element to readily flow to and away from this element.

It is therefore another object of the present invention to provide a temperature measuring apparatus which will eliminate the cause of the first-mentioned inaccurate temperature sensing noted supra by employing an insulating material between the inner wall of the vessel and the temperature sensing element placed therein and an air insulating chamber positioned between the inner and outer walls of the kettle.

It is also another object of the present invention to provide a temperature measuring apparatus that will eliminate the second cause of the inaccurate temperature sensing noted supra by providing a large thin flat heat conductive disc and a chamber into which a temperature responsive means which is operably connected therewith is placed and which disc is used to form a portion of the inner wall of the kettle.

It is still another object of the present invention to disclose a temperature measuring apparatus having a chamber of the aforementioned type which can accommodate either a thermocouple or a temperature responsive thermal-filled fluid so that the temperature of the contents within the kettle can be measured by either one or the other of these temperature measuring apparatuses.

It is a more specific object of the invention to provide an extremely accurate temperature measuring apparatus of the aforementioned type which is useful in determining the temperature of an edible or non-edible lard as it is being rendered from bones and other like parts by paddling these parts against the side of the type of steam kettle already described. It is imperative in a lard rendering process of this type that the lard which is being simultaneously melted and paddled off of the bones reach a predetermined desired temperature at which the most efficient rendering can take place. However if for the reasons already noted supra an inaccurate temperature measurement of this lard is made which indicates that the pre-determined desired temperature of the lard has not been reached where in reality it has been reached, the lard will burn and become unfit for use.

It therefore becomes another object of the present invention to provide a temperature measuring apparatus which will accurately indicate when the temperature of lard in a lard rendering kettle has reached a desired ideal rendering temperature condition so as to provide maximum rendering and at the same time avoid over-cooking and burning and discoloration of the lard.

Another object of the invention is to provide a temperature measuring apparatus which is provided with a temperature sensitive disc whose outer surface forms a smooth inner wall surface portion of either a single or double wall kettle.

In the drawings:

FIGURE 1 shows a cross-sectional front elevation view of how the temperature sensing element of the aforementioned disclosed improved temperature measuring apparatus can be fitted into the walls of a steam kettle;

FIGURE 2 shows a cross-sectional front elevation view of how the temperature sensing element of the aforementioned disclosed improved temperature measuring apparatus can be fitted into a single wall forming a kettle and FIGURE 3 shows an enlarged detail of a thermocouple element taken along the line 3—3 of FIGURE 2.

Referring now to the drawing in detail and particularly to FIGURE 1 thereof, the temperature measuring apparatus is generally designated by reference numeral 10. The temperature sensing end of this apparatus 10 is shown having a fixedly aligned outer sleeve portion 12 passing through aligned apertures 14 and 16. These apertures 14 and 16 are formed by the portions of the inner and outer walls 18, 20 of the steam kettle.

The entire peripheral surface of each of the end portions of the outer sleeve 12 are shown welded at 22 and 24 by means of a suitable welding material to the respective walls 18, 20 of the kettle.

With this arrangement it can be seen that steam which is used to heat the contents that are placed within the inner wall 18 of the kettle is permitted to be circulated in the jacket portion 26 which is formed by the two walls 18, 20 and to circulate also about the outer periphery of the outer sleeve 12.

The outer right end surface of the sleeve 12 has an inner chamfered circumferential lip at 28 which forms a protuberance against which the beveled edge 30 of a ring 32 is engaged. The edge 30 of ring 32 is shown being held tight against the chamfered lip surface 28 by an inner adjustable sleeve portion 34. Tightening of these two surfaces can take place because a threaded connection is provided at 36 between the left end portion of the inner surface of the outer sleeve 12 and the outer surface of the inner sleeve 34.

By rotating the left end portion 38 in one direction it can be seen that this screw connection at 36 will enable its right end 40 to move surface 30 of ring 32 into tight surface-to-surface contact with the bevel edge surface 28. By rotating end portion 38 in the opposite direction the surfaces 38 and 28 can be displaced from one another.

Within the ring 32 there is a cylindrical cavity 42 into which a bulb assembly 44 is inserted. This bulb assembly is comprised of a thin disc-shaped member 46 which is made of a heat treated steel and which is shown forming a portion of the inner wall surface of the kettle. This disc-shaped member 46 along with circular plate 48 which is silver-soldered at 50 to member 46 forms a mushroom-type bulb portion of the bulb assembly 44.

Integral with and protruding from the left end of the circular plate 48 there is shown a hollow externally threaded cylindrical embossed portion 52. A tube 54 protrudes into the left end of this cylindrical portion 52. This tube is welded at 56 to an unthreaded left end part 58 of the cylindrical portion 52.

Spaced apart from the inner wall of the tube 54 there is shown a capillary tube 60 which opens at its right end into the cavity formed by the bulb assembly 44 and is connected by means of a suitable flexible capillary tubing 61 at its other end to a temperature recorder 62. This temperature recorder is of the general type such as is disclosed in the C. B. Moore Patent 2,436,971 issued March 2, 1948.

To retain the bulb assembly 44 and tube 60 in a fixed position the threaded nut 64 is rotated along the threaded cylindrical portion 52 until its right end surface is brought into surface-to-surface engagement with the left end surface 66 of the wall forming the ring 32.

The cavity formed by the disc-shaped member 46, circular plate 48 and capillary tube 60 is filled with a suitable type of commercially available temperature sensitive fluid depending upon the use and range of the instrument.

Expansion of this fluid will take place when the temperature of the lard or other substance not shown that is contained within the inner wall of the kettle increases and this increase in heat is transmitted through the disc 46 to the fluid that is in the chamber immediately behind this disc. The expansion of the fluid in the thermal-filled system which then takes place is used to actuate the pen arm 68 in an up-scale direction along a chart 69 toward a desired temperature control point reading as is indicated by the position of the control point indicator 70.

It is imperative that the operator is able to have an accurate temperature measurement of the contents within the kettle particularly when approaching the highest temperature at which the most efficient lard rendering of the fatty bone parts within the kettle takes place without the lard being burned. As soon as the desired amount of rendering at this temperature has taken place the contents of the kettle are then removed. If the temperature as recorded by the pen 68 on the chart 69 should exceed the efficient lard rendering temperature as indicated by the contact point indicator 70, a valve, not shown, in a steam line which supplies steam to the jacket 18, 20 of the kettle can be closed and a portion of the steam already in the jacket expelled therefrom in order to prevent burning of the lard or other products which may be contained within the kettle.

The reason why the heretofore disclosed apparatus is able to provide a more accurate reading of the temperature of the ingredients within the kettle is that the ring shaped bulb member 32 is made from a phenolic or equivalent epoxy material which is a suitable insulation for withstanding the high degree of heat which the steam transmits to the wall of the outer sleeve 12 that is brought into contact with this ring 32. The ring 32 thus prevents this undesired heat in the steam jacket wall from being allowed to be transferred to the temperature sensitive fluid in the thermal system. It should further be noted that the only point of direct contact which the insulating ring member 32 makes with the steam heated wall of the kettle is at its beveled edge portion 30.

It can also be seen in FIGURE 1 of the drawing that the heat being dissipated from the material within the kettle will flow through the ring member 32 in a direction parallel to that of the conduit 54 passing through the inner sleeve and thence through the inner cavity portion that is formed by the inside wall surface of the inner sleeve 34 to the ambient temperature of the atmosphere surrounding the external wall 12 of the kettle. Such a heat flow arrangement is possible because any heat which is transferred through the walls of the outer and inner sleeves 12, 34 by convection will also flow through the inner cavity portion that is formed by the inside wall surface of the inner sleeve 34 to atmospheric temperature.

With this arrangement it can be seen that the last-mentioned flow of heat is not allowed to flow back toward the fluid located in the cavity formed by disc 48 of bulb member 44 where the temperature sensing fluid is located as is the case when using other prior art temperature measuring devices.

Therefore, in effect the space formed by the wall of the inner sleeve 34 acts as an air insulating device for the fluid-filled temperature sensing member 44.

In using steam kettles for lard rendering it is important that the element used to sense the temperature of the contents such as fatty bones placed therein be rugged and also be able to withstand the mechanical blows caused by these bones being paddled against the inside surface of the kettle. To this end another feature which the present temperature measuring apparatus possesses is that the right end 72 of the outer sleeve portion 12 has a radius R' which is made to substantially coincide with the radius R of the inner wall of the kettle.

Such a structural arrangement has been found beneficial in that the thin heat treated steel temperature sensing disc 46 can withstand greater mechanical shocks from rotating bones etc. than prior art sensing elements that have been used for this purpose.

FIGURE 2 discloses how certain identical parts to those parts which are disclosed for the temperature measuring apparatus disclosed in FIGURE 1 can be employed with a thermocouple in lieu of a thermal-filled system to measure the temperature of the ingredients within a single wall kettle.

It should be understood that the apparatus disclosed in FIGURE 2 which employs a thermocouple as its sensing element could readily be connected to a two wall kettle, in the manner similar to that shown in FIGURE 1, in lieu of to a single wall to measure the temperature of the material that is within a kettle. It should also be understood that the thermal type of temperaure sensing apparatus as that which is disclosed in FIGURE 1 could readily be employed in a manner similar to that shown in FIGURE 2 to measure the temperature of the material that is within a kettle having a single wall rather than the double wall shown in FIGURE 1.

FIGURE 2 is a view similar to that shown in FIGURE 1 in that an outer and inner sleeve 12, 35; disc 32 and member 46 are identical to the parts identified by these same reference numerals in FIGURE 1.

One of the chief differences between FIGURES 1 and 2 is that a larger bored out hole 74 is made in the circular plate 76 and its associated hollow externally threaded cylindrical embossed portion 78 than is present in the circular plate 48 and the cylindrical embossed portion 58 shown in FIGURE 1. The purpose for drilling this larger bore is to accommodate a fiberglass sleeve 80 protecting two dissimilar wire thermocouple leads 82, 84 that are within the insulated wire covering 86. FIGURE 3 shows one end of each of these wires 82, 84 connected by means of solder at 88, 90 to the disc 46 and in surface-to-surface contact with each other to form the hot junction of a thermocouple.

The other end of these wires 82, 84 are connected in a conventional fashion with an indicating potentiometer 92 and in a well-known manner to a cold junction contained therein, not shown.

This potentiometer may be of the type such as that which is disclosed in the Wills Patent No. 2,423,540, issued July 8, 1947. This indicating potentiometer is provided with a pen 94 which moves across a chart 96 in one direction or another depending on whether the temperature being sensed at the hot thermocouple junction of leads 82, 84 in contact with disc 46 is being increased or decreased. This indicating potentiometer is also provided with a rotatable pointer 98 to indicate whether the aforementioned temperatures sensed by the thermocouple is increasing or decreasing.

Although not shown in either FIGURE 1 or 2 it should be understood that suitable automatic controlling means can be employed if desired with either of the recorders shown in these figures which will provide a desired control of either the amount of steam flowing into the steam jacket 18, 20 as shown in FIGURE 1 or to provide a control of the amount of fuel employed to heat the single wall kettle 100 shown in FIGURE 2.

In place of the dual wall kettle construction 18, 20 shown in FIGURE 1, it can be seen that FIGURE 2 shows the temperature measuring apparatus disclosed therein as being mounted in a single wall 100. The entire, outer peripheral edge of the right end of the outer sleeve 12 shown in FIGURE 2 is welded as shown at 102 in a manner similar to the way the inner kettle wall 18 shown in FIGURE 1 is welded to the edge of its sleeve 12.

From the aforementioned description it can be seen that a rugged temperature measuring apparatus is disclosed which will afford an extremely accurate way of taking the temperature of a bony substance, from which e.g. a substance such as lard is to be rendered, when it is placed in a kettle and which measurement will not be affected by extraneous heat sources such as the heat from being employed to heat the kettle walls.

Because this temperature measuring apparatus provides an operator with a very accurate temperature measurement of the substances within a kettle it will enable him to safely increase the amount of heat being applied to raise the temperature of these substances to a desired level at which maximum rendering can take place without these substances being over-cooked or burnt.

I claim:

1. An apparatus to accurately measure the temperature of material within a steam kettle, comprising a thin temperature hardened flat metal disc forming a first inner wall portion of said kettle, horizontally positioned thermocouple leads extending away from said disc and joined together at one of their ends at a location that is juxtapositioned on said outer flat central portion of said disc to form a hot thermocouple junction, an outer sleeve circumferentially spaced about said disc and said thermocouple leads and being in fixed relation thereto, said sleeve being positioned to extend substantially normal to said first inner wall and an outer wall of said kettle, said sleeve having an outer chamfered edge on one of its end surfaces to form a second inner wall portion of said kettle, a phenolic ring positioned within said sleeve and surrounding both said flat metal disc and said end portion of said thermocouple leads, a circular end surface of said ring forming a third inner wall portion of said kettle, said first, second and third inner wall portions forming a single continuous rugged inner wall surface of said kettle and said other end portion of said thermocouple leads being connected to an indicating potentiometer to indicate when temperature changes take place at said hot junction.

2. An apparatus to accurately measure the temperature of material within a steam kettle, comprising a thin temperature hardened flat metal disc forming a first inner wall portion of said kettle, a horizontally positioned thermal-filled capillary extending away from said disc and opening into a chamber having one of its walls formed by said disc, an outer sleeve circumferentially spaced about said disc and said capillary and being in fixed relation and extending substantially normal to said first inner wall and an outer wall of said kettle, said sleeve having an outer chamfered edge on one of its end surfaces to form a second inner wall portion of said kettle, a phenolic ring positioned within said sleeve and surrounding both said flat metal disc and a portion of said capillary, a circular end surface of said ring forming a third inner wall portion of said kettle, said first, second and third inner wall portions forming a single continuous rugged inner wall surface of said kettle and said other end portion of said capillary being connected to a temperature indicator to indicate when said temperature changes take place by measuring the magnitude of the expansion and contraction of the fluid taking place in said chamber and capillary.

3. An apparatus to accurately measure the temperature of rotating lard as it is being rendered by paddling and heating from bones and other like products retained within a steam kettle, comprising a sleeve extending through apertures formed by an inner and outer steam jacket wall of said kettle and being fixedly connected thereto, said sleeve forming a first portion of said inner wall of said jacket, an insulator ring fixedly positioned within the said sleeve, said insulator ring being positioned adjacent said inner wall of said steam jacket and forming a second portion of said inner wall of said jacket, an outer peripheral portion of said second portion of said inner wall being in sealed contact with said first portion of the inner wall, a temperature sensitive means positioned within said insulator ring and having a part which forms a third portion of said inner wall of said jacket, an outer peripheral portion of said third portion of said inner wall being in sealed contact with said second portion of said inner wall, said first, second and third inner wall portions providing a substantially smooth continuous surface with said inner surface of said jacket and a measuring instrument connected to said temperature sensing means to indicate the magnitude of heat being transmitted through said third inner wall portion of said temperature sensitive means by said lard products to be rendered that are retained within said inner wall of said steam jacket.

4. The apparatus as specified in claim 3 wherein said temperature sensitive means is comprised of a thermal-filled system.

5. The apparatus as specified in claim 3 wherein the said temperature sensitive means is provided with two dissimilar metal wires having end portions thereof in contact with one another and each end portion being soldered to the outer surface of said third inner wall portion having end portions thereof to thereby form a hot junction.

6. The apparatus as specified in claim 3 wherein a thermal-filled system and two dissimilar metal wires that have end portions thereof in contact with one another and which are each soldered to the outer surface of the third inner wall portion to form a hot junction is selectively employed as said temperature sensing means.

7. The apparatus as specified in claim 3 wherein said insulator ring provides a means of preventing said heat which flows through said walls of said jacket from being brought into contact with said temperature sensing means.

8. A temperature sensitive apparatus for use with a potentiometric measuring circuit to measure the temperature of contents within a steam kettle having an inner and outer wall, comprising an outer sleeve having one of its ends forming an integral portion of said inner wall and its other end protruding through said outer wall, a circumferential protuberance on the inner surface of said outer sleeve adjacent said end forming an integral portion of said inner wall, a high temperature resistant ring having an outer chamfered peripheral edge portion thereof in surface-to-surface contact with the inner surface of said protuberance and the remaining outer peripheral surface of said ring extending in spaced relation with a remaining portion of said inner wall surface of said outer sleeve, said ring having a plurality of aligned apertures each formed by an inner centrally located wall portion of said ring, a temperature sensitive hollow casing filling said space formed by said apertures in said inner centrally located wall portion of said ring and having a thin disc which forms another portion of said inner wall of the said kettle and two dissimilar metal leads of said potentiometric measuring circuit having their ends joined together and in contact with the outer wall of said disc to measure the temperature of the contents in said steam kettle.

9. The temperature sensing apparatus specified in claim 8, including an inner sleeve having an end that is threadedly mounted with the inner wall surface of said outer sleeve and having its other end in contact with said ring to provide a means of retaining said chamfered edge of said ring in tight contact with said protuberance.

10. The temperature sensing apparatus specified in claim 8 wherein an end of an inner sleeve that is threadedly mounted with the inner wall surface of said outer sleeve which has one of its ends in contact with said ring is employed to provide a means of retaining said chamfered edge of said ring in tight contact with said protuberance and said temperature sensing hollow casing having an embossed threaded portion extending in a direction away from its thin disc to accommodate a threadedly mounted member thereon and wherein the rotation of said threadedly mounted member in one direction will retain said temperature sensing hollow casing in fixed contact with said ring and the rotation of said threadedly mounted member in the opposite direction after said inner sleeve has been removed by unthreadeding it from its associated inner wall surface enabling said hollow casing to be readily removed from said disc.

11. The temperature sensing apparatus as specified in claim 8 including an inner sleeve that is threadedly mounted with the inner wall surface of said outer sleeve which has one of its ends in contact with said ring to provide a means of retaining said chamfered edge of said ring in tight contact with said protuberance and wherein a non-occupied area is formed by said inner surface of said inner sleeve to provide an air insulating chamber for said juncture of said two dissimilar metals.

12. An apparatus to accurately measure the temperature of material within a steam kettle, comprising a thin temperature hardened flat metal disc forming a wall of said kettle, a horizontally positioned thermal-filled capilraly extending away from said disc and opening into a chamber having one of its walls formed by said disc, an outer sleeve circumferentially spaced about said disc and said capillary and being in fixed relation and extending substantially normal to said wall of said kettle, said sleeve having an outer chamfered edge on one of its end surfaces to form a second inner wall portion of said kettle, a phenolic ring positioned within said sleeve and surrounding both said flat metal disc and a portion of said capillary, a circular end surface of said ring forming a third inner wall portion of said kettle, said first, second and third inner wall portions forming a single continuous rugged inner wall surface of said kettle and said other end portion of said capillary being connected to a temperature indicator to indicate when said temperature changes take place by measuring the magnitude of the expansion and contraction of the fluid taking place in said chamber and capillary.

13. An apparatus to accurately measure the temperature of material within a steam kettle, comprising a thin temperature hardened flat metal disc forming a wall of said kettle horizontally positioned thermocouple leads extending away from said disc and joined together at one of their ends at a location that is juxtapositioned on said outer flat central portion of said disc to form a hot thermocouple junction, an outer sleeve circumferentially spaced about said disc and said thermocouple leads and being in fixed relation thereto, said sleeve being positioned to extend substantially normal to said wall of said kettle, said sleeve having an outer chamfered edge on one of its end surfaces to form a second inner wall portion of said kettle, a phenolic ring positioned within said sleeve and surrounding both said flat metal disc and said end portion of said thermocouple leads, a circular end surface of said ring forming a third inner wall portion of said kettle, said first, second and third inner wall portions forming a single continuous rugged inner wall surface of said kettle and said other end portion of said thermocouple leads being connected to an indicating potentiometer to indicate when temperature changes take place at said hot junction.

References Cited in the file of this patent
UNITED STATES PATENTS

| | | |
|---|---|---|
| 1,347,329 | Hall | July 20, 1920 |
| 1,969,105 | Smulski | Aug. 7, 1934 |
| 2,032,407 | Frickey | Mar. 3, 1936 |
| 2,520,872 | Zuehlke | Aug. 29, 1950 |